(12) United States Patent
Hoschouer et al.

(10) Patent No.: US 9,403,498 B2
(45) Date of Patent: Aug. 2, 2016

(54) ENERGY ABSORBING ASSEMBLY FOR VEHICLE

(71) Applicant: Shiloh Industries, Inc., Valley City, OH (US)

(72) Inventors: Clifford J. Hoschouer, Medina, OH (US); Stephen A. Fetsko, Medina, OH (US)

(73) Assignee: Shiloh Industries, Inc., Valley City, OH (US)

( * ) Notice: Subject to any disclaimer, the term of this patent is extended or adjusted under 35 U.S.C. 154(b) by 0 days.

(21) Appl. No.: 14/221,226

(22) Filed: Mar. 20, 2014

(65) Prior Publication Data

US 2014/0284948 A1 Sep. 25, 2014

Related U.S. Application Data

(60) Provisional application No. 61/803,746, filed on Mar. 20, 2013.

(51) Int. Cl.
*B60R 19/34* (2006.01)

(52) U.S. Cl.
CPC ....................................... *B60R 19/34* (2013.01)

(58) Field of Classification Search
CPC ........................................................ B60R 19/34
USPC ................................................. 293/132, 133
See application file for complete search history.

(56) References Cited

U.S. PATENT DOCUMENTS

| | | | |
|---|---|---|---|
| 3,412,628 A | 11/1968 | DeGain | |
| 3,493,082 A | 2/1970 | Bell | |
| 3,564,688 A | 2/1971 | DeGain | |
| 3,599,757 A * | 8/1971 | Takamatsu et al. | 188/371 |
| 3,887,223 A | 6/1975 | Bez | |
| 3,998,485 A * | 12/1976 | Putter et al. | 293/133 |
| 4,023,652 A * | 5/1977 | Torke | 188/377 |
| 4,152,012 A * | 5/1979 | Reidelbach et al. | 280/784 |
| 4,190,276 A | 2/1980 | Hirano et al. | |
| 4,272,114 A | 6/1981 | Hirano et al. | |
| 4,355,844 A | 10/1982 | Fantini Muzzarelli | |

(Continued)

FOREIGN PATENT DOCUMENTS

| | | | |
|---|---|---|---|
| EP | 1477371 A3 | 8/2005 | |
| EP | 1541424 B1 | 1/2008 | |

(Continued)

OTHER PUBLICATIONS

Dictionary definition of "segment" as provided by Dictionary.com http://dictionary.reference.com/browse/segment Dec. 11, 2015.*

(Continued)

*Primary Examiner* — H Gutman (74) *Attorney, Agent, or Firm* — Reising Ethington, P.C.

(57) ABSTRACT

An energy absorbing assembly, sometimes referred to as a crush tip assembly, that is mounted to a body-on-frame vehicle, either behind a front or rear bumper, so that the assembly absorbs energy in during a collision. The energy absorbing member is a multi-piece assembly where adjoining segments are secured together with a welded joint that may include a non-linear portion having one or more junction features. The specific arrangement of the non-linear portion, along with other optional secondary features like strengthening ribs, holes, slots, etc., can be used to achieve more desirable energy profiles during a collision event.

18 Claims, 5 Drawing Sheets

(56) References Cited

U.S. PATENT DOCUMENTS

| | | | |
|---|---|---|---|
| 4,410,208 A | 10/1983 | Mulso, Jr. et al. | |
| 4,684,151 A | 8/1987 | Drewek | |
| 5,192,157 A | 3/1993 | Laturner | |
| 5,431,445 A | 7/1995 | Wheatley | |
| 5,549,327 A * | 8/1996 | Rusche et al. | 280/751 |
| 5,732,801 A | 3/1998 | Gertz | |
| 5,913,565 A | 6/1999 | Watanabe | |
| 6,003,934 A | 12/1999 | Usui | |
| 6,099,071 A | 8/2000 | Kasuga et al. | |
| 6,174,009 B1 | 1/2001 | McKeon | |
| 6,293,587 B1 | 9/2001 | Lapic et al. | |
| 6,406,088 B1 | 6/2002 | Tate | |
| 6,422,604 B2 | 7/2002 | Lapic | |
| 6,472,043 B1 | 10/2002 | Kobayashi et al. | |
| 6,474,709 B2 | 11/2002 | Artner | |
| 6,554,333 B2 | 4/2003 | Shimotsu et al. | |
| 6,588,830 B1 | 7/2003 | Schmidt et al. | |
| 6,595,502 B2 | 7/2003 | Koch et al. | |
| 6,655,728 B2 * | 12/2003 | Sano et al. | 296/187.09 |
| 6,681,907 B2 | 1/2004 | Le | |
| 6,820,924 B2 | 11/2004 | Caliskan et al. | |
| 6,830,286 B2 | 12/2004 | Bechtold et al. | |
| 6,834,898 B2 | 12/2004 | Wang et al. | |
| 6,893,078 B2 | 5/2005 | Saeki | |
| 6,899,195 B2 | 5/2005 | Miyasaka | |
| 6,907,817 B2 | 6/2005 | Parks | |
| 6,929,297 B2 | 8/2005 | Muller et al. | |
| 6,932,201 B2 | 8/2005 | Akiyama et al. | |
| 6,942,262 B2 | 9/2005 | Glasgow et al. | |
| 6,957,846 B2 | 10/2005 | Saeki | |
| 7,008,007 B2 | 3/2006 | Makita et al. | |
| 7,021,686 B2 | 4/2006 | Glasgow et al. | |
| 7,070,217 B2 | 7/2006 | Longo | |
| 7,182,191 B2 | 2/2007 | Scott et al. | |
| 7,201,413 B2 | 4/2007 | Hillekes et al. | |
| 7,213,867 B2 | 5/2007 | Haneda | |
| 7,240,933 B2 | 7/2007 | Glasgow et al. | |
| 7,306,081 B2 | 12/2007 | Tamada et al. | |
| 7,357,432 B2 | 4/2008 | Roll et al. | |
| 7,357,445 B2 | 4/2008 | Gross et al. | |
| 7,370,893 B2 | 5/2008 | Tamada et al. | |
| 7,389,860 B2 | 6/2008 | Abu-Odeh et al. | |
| 7,393,029 B2 | 7/2008 | Glasgow et al. | |
| 7,416,043 B2 | 8/2008 | Pipkorn et al. | |
| 7,484,781 B1 | 2/2009 | Garber et al. | |
| 7,617,916 B2 | 11/2009 | Heatherington et al. | |
| 7,651,155 B2 | 1/2010 | Tan et al. | |
| 7,677,617 B2 | 3/2010 | Stewart et al. | |
| 7,695,052 B2 | 4/2010 | Nusier et al. | |
| 7,871,122 B2 | 1/2011 | Salomonsson | |
| 7,905,366 B2 | 3/2011 | Jaede | |
| 7,918,493 B2 | 4/2011 | Nishiguchi et al. | |
| 7,963,378 B2 | 6/2011 | Glance et al. | |
| 7,976,082 B2 | 7/2011 | Song | |
| 8,016,344 B2 | 9/2011 | Tamada | |
| 8,123,263 B2 | 2/2012 | Evans | |
| 8,152,211 B2 | 4/2012 | Klimek | |
| 8,172,286 B2 | 5/2012 | Klimek | |
| 8,276,955 B2 | 10/2012 | Baccouche et al. | |
| 8,287,013 B2 | 10/2012 | Kano et al. | |
| 8,376,427 B2 | 2/2013 | Perarnau Ramos et al. | |
| 8,398,152 B1 | 3/2013 | Mazur et al. | |
| 8,430,437 B2 | 4/2013 | Asakawa et al. | |
| 8,439,412 B2 | 5/2013 | Klimek | |
| 8,459,726 B2 | 6/2013 | Tyan et al. | |
| 8,539,737 B2 | 9/2013 | Tyan et al. | |
| 8,596,711 B2 | 12/2013 | Yasui et al. | |
| 8,641,129 B2 | 2/2014 | Tyan et al. | |
| 2004/0250404 A1 | 12/2004 | Cripsey | |
| 2005/0029836 A1 | 2/2005 | Caliskan et al. | |
| 2005/0056075 A1 | 3/2005 | Cripsey | |
| 2006/0096099 A1 | 5/2006 | Cripsey et al. | |
| 2006/0125251 A1 * | 6/2006 | Glasgow et al. | 293/132 |
| 2006/0237976 A1 | 10/2006 | Glasgow et al. | |
| 2007/0176442 A1 | 8/2007 | Mori et al. | |
| 2007/0236025 A1 | 10/2007 | Glasgow et al. | |
| 2008/0007088 A1 | 1/2008 | Newport | |
| 2008/0098601 A1 | 5/2008 | Heinz et al. | |
| 2008/0106107 A1 * | 5/2008 | Tan et al. | 293/133 |
| 2011/0015902 A1 | 1/2011 | Cheng et al. | |
| 2011/0163587 A1 | 7/2011 | Kmeid et al. | |
| 2011/0233016 A1 | 9/2011 | Lim | |
| 2011/0291431 A1 | 12/2011 | Buschsieweke et al. | |
| 2012/0119526 A1 | 5/2012 | Clausen et al. | |
| 2012/0152675 A1 | 6/2012 | Mori | |
| 2013/0001963 A1 | 1/2013 | Haneda et al. | |
| 2013/0154286 A1 | 6/2013 | Tamada et al. | |
| 2013/0193699 A1 | 8/2013 | Zannier | |
| 2013/0197717 A1 | 8/2013 | Fraser et al. | |
| 2013/0292968 A1 | 11/2013 | Tyan et al. | |
| 2013/0307288 A1 | 11/2013 | Wavde et al. | |
| 2013/0313840 A1 | 11/2013 | Kashiwagi et al. | |
| 2013/0341115 A1 | 12/2013 | Tyan et al. | |
| 2014/0008925 A1 | 1/2014 | Impero | |

FOREIGN PATENT DOCUMENTS

| | | |
|---|---|---|
| FR | 2962390 A1 | 1/2012 |
| GB | 2323146 | 9/1998 |
| JP | 2002054672 A | 2/2002 |
| JP | 2003211234 A | 7/2003 |
| KR | 20100061288 A | 6/2010 |

OTHER PUBLICATIONS

International Search Report and Written Opinion dated Jul. 11, 2014, 15 pages.

\* cited by examiner

ENERGY ABSORBING ASSEMBLY FOR VEHICLE

REFERENCE TO RELATED APPLICATIONS

This application claims the benefit of U.S. Provisional Ser. No. 61/803,746 filed on Mar. 20, 2013, the entire contents of which are incorporated herein by reference.

TECHNICAL FIELD

The present disclosure generally relates to energy absorbing components for a vehicle and, more particularly, to energy absorbing components coupled between a vehicle bumper and a vehicle frame.

BACKGROUND

Various types of energy absorbing components, such as crush rails, tips, boxes, etc., have been used and are designed to absorb energy during a vehicle collision. More specifically, energy absorbing components have been attached to the front and rear vehicle bumpers so that during a collision, some of the associated energy or force is absorbed by the component instead of being transmitted to the vehicle cabin.

The total amount of energy absorbed during a collision is one consideration for the design of such a component, while minimizing the energy profile peaks and valleys and thereby smoothing the energy profile associated with the collision may be another.

SUMMARY

According to one aspect, there is provided an energy absorbing assembly for use with a vehicle. The energy absorbing assembly comprising: a first axial end for coupling to a vehicle bumper; a second axial end for coupling to a vehicle frame; and a plurality of segments extending between the first and second axial ends of the assembly and being welded together, the plurality of segments includes a first segment that extends from the first axial end, a second segment that extends from the first segment, and a welded junction that is located at the interface of the first and second segments and includes a non-linear portion. The non-linear portion is configured to influence the transmission of energy from the first segment to the second segment across the welded junction during a collision event.

According to another aspect, there is provided an energy absorbing assembly for use with a vehicle. The energy absorbing assembly, comprising: a first axial end for coupling to a vehicle bumper; a second axial end for coupling to a vehicle frame; a plurality of segments extending between the first and second axial ends of the assembly and being welded together, the plurality of segments includes a first segment, a second segment, and a welded junction that is located at the interface of the first and second segments and includes at least one junction feature; and at least one secondary feature being formed in one of the first or second segments and being axially spaced from the at least one junction feature. Wherein the at least one junction feature and the at least one secondary feature are aligned along the assembly in order to cooperate with one another and influence the transmission of energy through the assembly during a collision event.

According to another aspect there is provided a method of absorbing energy at a front or rear bumper of a vehicle. The method may comprise the steps of: receiving an external collision force at a first axial end of an energy absorbing assembly via the front or rear bumper, the energy absorbing assembly having first and second segments joined to one another by a welded junction, the welded junction includes a non-linear portion with one or more junction features; absorbing a portion of the energy of the external collision force in the first segment nearest the bumper; lessening energy profile peaks and energy profile valleys as the energy of the external collision propagates across the weld joint from the first segment to the second segment, wherein the lessening of the energy profile peaks and valleys is at least partially caused by the non-linear portion; and absorbing a portion of the energy of the external collision force in the second segment.

DRAWINGS

Preferred exemplary embodiments will hereinafter be described in conjunction with the appended drawings, wherein like designations denote like elements, and wherein.

DETAILED DESCRIPTION

Figure 1:
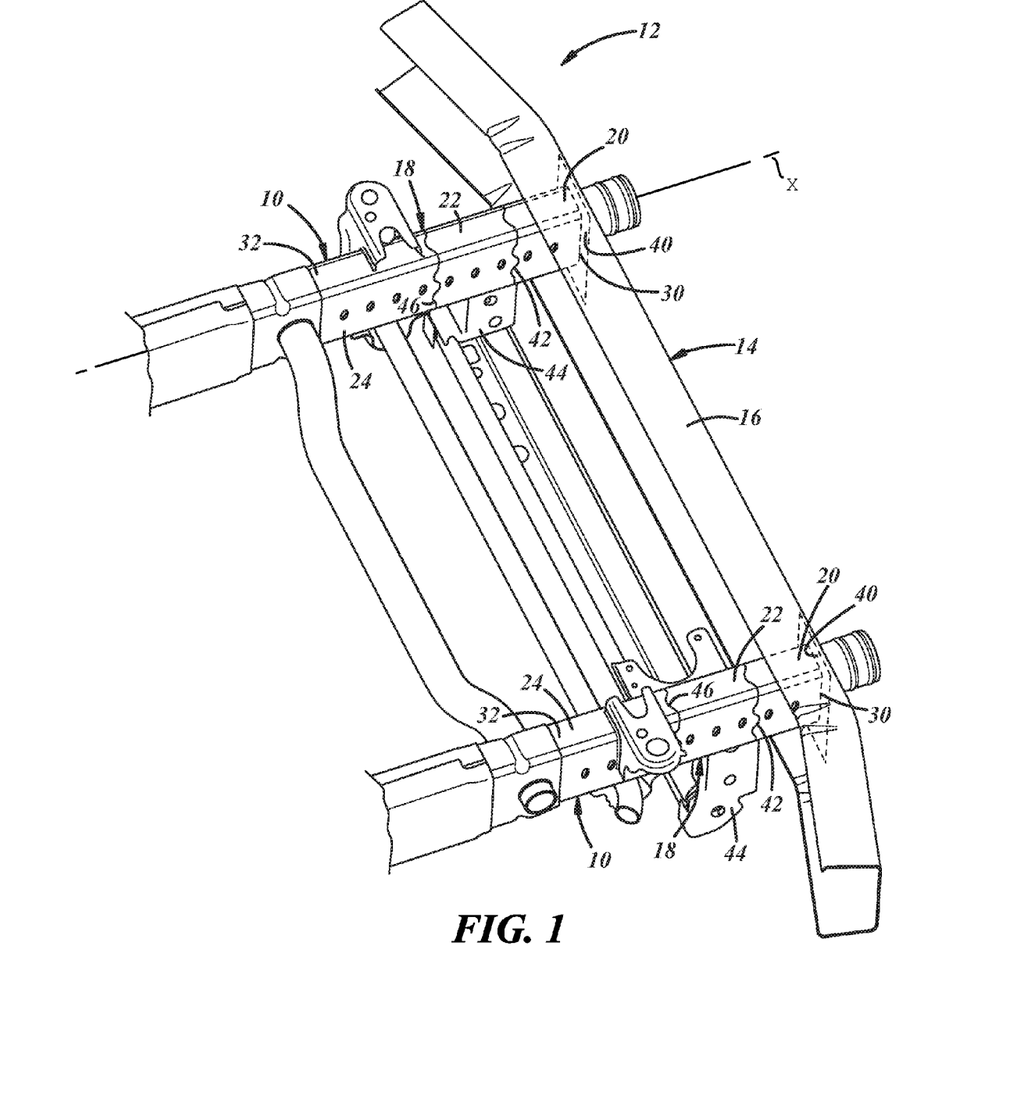
FIG. 1 is a perspective view of a portion of a vehicle front end, where a pair of exemplary energy absorbing assemblies are coupled or mounted between a vehicle front bumper and a vehicle frame.

There is disclosed an energy absorbing assembly or member 10 (also referred to as a crush tip assembly) that may be attached or mounted to a body-on-frame vehicle, either behind a front or rear bumper, so that the assembly absorbs energy in during a collision. With reference to FIG. 1, there is shown a vehicle front end 12 that carries a pair of energy absorbing assemblies 10 that are installed between a front bumper 14 and a portion of the vehicle frame. It should be recognized, however, that the energy absorbing assemblies 10 may be employed in any number of different settings or applications, including vehicle front and/or rear bumpers, and are not limited to the examples described herein.

The energy absorbing assembly 10 may be designed to collapse or deform along its longitudinal axis in an effort to absorb energy during a collision event and minimize injuries to the vehicle occupants. The energy absorbing assembly 10 is a multi-piece assembly that may be designed to influence or manipulate the absorption and/or transmission of energy in the assembly during impact and generally includes a body 18 having a first segment 20, a second segment 22, and a third segment 24. According to this particular embodiment, the energy absorbing assembly 10 has a generally uniform cross-sectional shape and size (e.g., a rectangular shape) along its longitudinal axis from a first axial end 30 to a second axial end 32. The different segments of the energy absorbing assembly 10 may have different axial lengths, they may be made of different gauge metal, and/or they may be made with different types of metals having different strengths and other properties, to cite a few possibilities. This multi-piece arrangement allows for a customized or tailored assembly, where the characteristics of each segment can be separately selected. Any reference in the following description to "axial" or "axially" is intended to refer to the longitudinal or central axis of the energy absorbing assembly 10.

Figure 2:
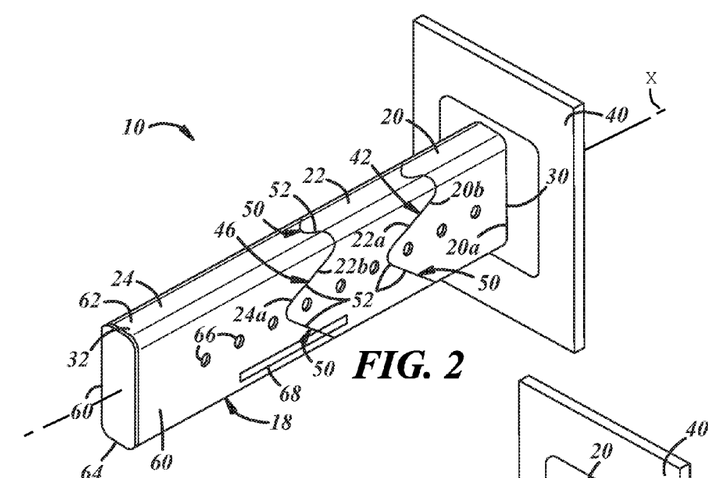
FIGS. 2-6 are perspective views of different exemplary embodiments of energy absorbing assemblies.

According to the exemplary arrangement shown in FIG. 2, first segment 20 is located closest to a vehicle bumper and, thus, is the first of the several segments of the multi-piece assembly 10 to experience the associated force or energy of a collision. In one example, the first segment 20 extends from a proximate end 20a to a distal end 20b and is made from a relatively thin metal (e.g., some type of high-strength or ultra high-strength steel of about 1.75 mm-2.0 mm in thickness) and is designed to buckle first and, thus, absorb some of the initial force or impact of a collision event. The first segment 20 may include or may be connected to a mounting flange 40, which is located at the first axial end 30 of the assembly 10 and is designed for secure attachment to the vehicle bumper 14.

The second segment 22 is connected to and extends from the first segment 20 and includes a proximate end 22a and a distal end 22b. The proximate end 22a is connected to the distal end 20b at a first welded junction 42, which laterally or radially extends across the width of the assembly and may be a laser or other type of weld seam joining the two segments 20, 22 together. In this particular embodiment, second segment 22 can be made from a somewhat thicker metal than that of the first segment 20 (e.g., a high-strength or ultra high-strength steel of about 2.0 mm-2.25 mm in thickness), and the second segment is somewhat longer in axial length than the first segment. During a collision event, it is generally desirable for the energy to be absorbed in each segment of the assembly 10 and for it smoothly transfer or propagate across welded junctions located therebetween. For instance, as energy from a collision event is being absorbed and transmitted along the axial length of the first segment 20, it is preferable that the energy have as smooth a transition as possible across the first junction 42 and into the second segment 22. This may help reduce force- or impact-related spikes and transients that can be seen in an energy profile, as will be described in greater detail below. The phrase "collision event" may include any event that applies enough force to the vehicle to at least partially collapse one or more segments of the assembly 10. FIG. 1 shows an example where the second segment 22 may be designed to receive a bracket 44, which can then be attached to some other member or device as shown. This is an optional feature.

The third segment 24 is connected to and extends from the second segment 22 and includes a proximate end 24a. The proximate end 24a is likewise connected to the distal end 22b of the second segment 22 at a second welded junction 46 and can also be a laser or other type of weld seam. According to one example, the third segment 24 is comprised of a somewhat thicker metal material than that of the first and second segments 20, 22 (e.g., a high-strength or ultra high-strength steel of about 2.25 mm-2.75 mm in thickness) and can be somewhat longer in length than the preceding segments 20, 22 as well. In addition, the metals or other materials of the first, second, and third segments 20, 22, 24 may be individually selected and can differ from one another in order to exhibit a certain energy absorbing performance. According to one possibility, first segment 20 is made from a thinner or weaker metal and/or is shorter in axial length than second segment 22, and the second segment 22 is made from a thinner or weaker metal and/or is shorter in axial length than third segment 24. This arrangement is not necessary, but it may be beneficial for energy absorbing assembly 10 to buckle or deform like an accordion during a collision event where the first segment 20 buckles first, followed by the second and third segments 22, 24.

It should be appreciated that the energy absorbing assembly 10 is not limited to the exemplary three-piece embodiment shown in the drawings, as assemblies with more or less segments could be used instead. Moreover, it is not necessary that the different segments have different axial lengths, material compositions, thicknesses, strengths, etc., as the segments could be uniform or equal in one or more of these areas. Any combination of steels (e.g., traditional steels, high-strength steels, ultra-high strength steels, etc.), as well as other materials like those based on aluminum may be used to make one or more of the different segments.

FIGS. 2-5 show exemplary embodiments of energy absorbing assemblies 10 having a variety of different first and second welded junctions 42, 46. Each of the welded junctions 42, 46 is located at an interface of adjacent segments and includes at least one non-linear portion that is configured to influence the transmission of force or energy from one segment to another across that junction. In each of these embodiments, the adjacent segments have the same cross-sectional shape and size at the interface so that the welded junction 42, 46 includes a non-overlapping butt joint, as opposed to an overlapping lap joint or the like. This is not mandatory, however, as the non-linear portions described herein could be used with other types of joints and are not limited to butt joints.

Figures 3, 4:
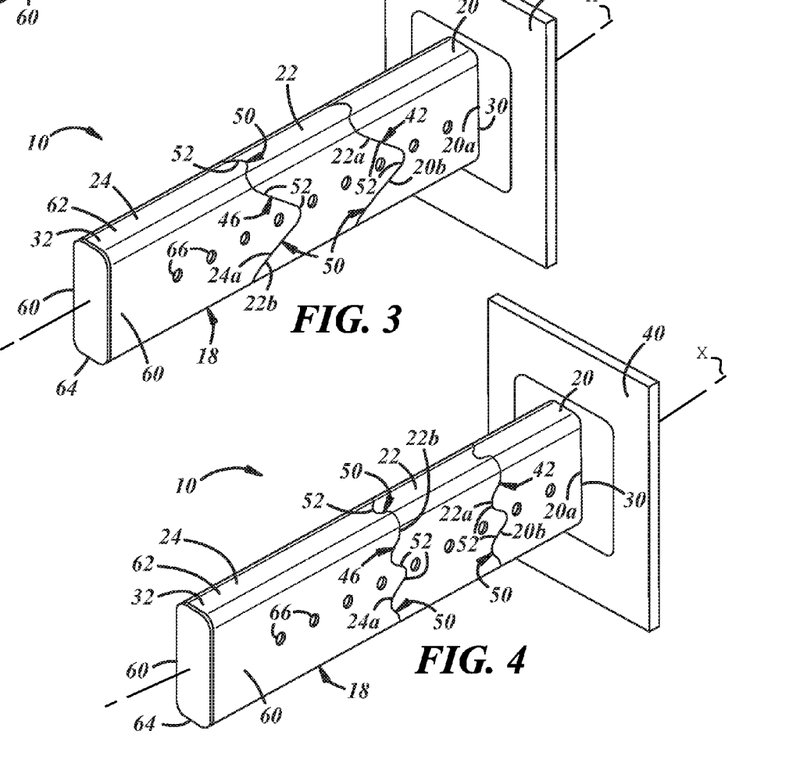

According to one embodiment, the energy absorbing assembly 10 includes first, second, and third segments 20, 22, 24 connected by first and second welded junctions 42, 46 having a non-linear portion 50 with one or more junction features—i.e., the non-linear portion 50 has one or more junction features 52, such as a peak, a valley, an angled straight section, a curved section, etc. The illustrated embodiments have straight features, curved features, or a combination of both. For example, the junction features 52 in FIG. 2 resemble a large single-peak. In FIG. 3, the junction features resemble a large single-valley or a reverse single-peak (reverse with respect the orientation of FIG. 2). The junction features 52 of FIG. 4 resemble a double-peak (e.g., having an alternating peak and valley) and are somewhat smaller or less pronounced than in the preceding embodiments. And in FIG. 5 some of the junction features resemble a double-valley or a reverse double-peak. These are, of course, merely examples and other non-linear portions 50 and junction features 52 are possible. The size, shape, location, orientation, etc. of the junction features may be selected for certain properties and may differ from those examples shown in the drawings. Groupings or arrangements of multiple junction features may be made to form a generally sinusoidal waveform that extends mostly or entirely along the width of the energy absorbing assembly 10. It should be appreciated that non-linear portions 50 and/or junction features 52 may or may not be the same on different sides or faces 60 of the assembly 10. In at least one embodiment, the non-linear portions 50 and/or junction features 52 on one side 60 mirror those on the opposing side.

Each of the inter-segment junctions 42, 46 are designed to manipulate or influence the transfer of collision energy across the boundary from one segment to another. By specifically locating the junction features 52—for example, by locating two or more peaks and valleys on the wider sides or faces 60 of the assembly 10—collision energy transmission across the welded junctions 42, 46 may be controlled in a manner that mitigates the spikes mentioned above.

In some instances (e.g., FIGS. 2-5), the non-linear portions 50 and junction features 52 may be on the narrower top and/or bottom sides or faces 62, 64 as well. It should be appreciated that any combination of junction features 52, including peaks, valleys, straight sections, radiuses, curves, etc. may be used, and that different size junction features may be included along a single junction in order to vary the energy transmission properties of that junction. Embodiments also exist having entirely straight junctions (i.e., no non-linear portion 50) on the top side 62, the bottom side 64, either or both of the wider sides 60, or any combination thereof. Furthermore, even though junction features 52 shown in FIGS. 2-5 are the same at the first junction 42 and the second junction 46, this is not required; the first junction 42 may have different non-linear portions 50 and features 52 than the second junction 46.

Figures 5, 6, 7:
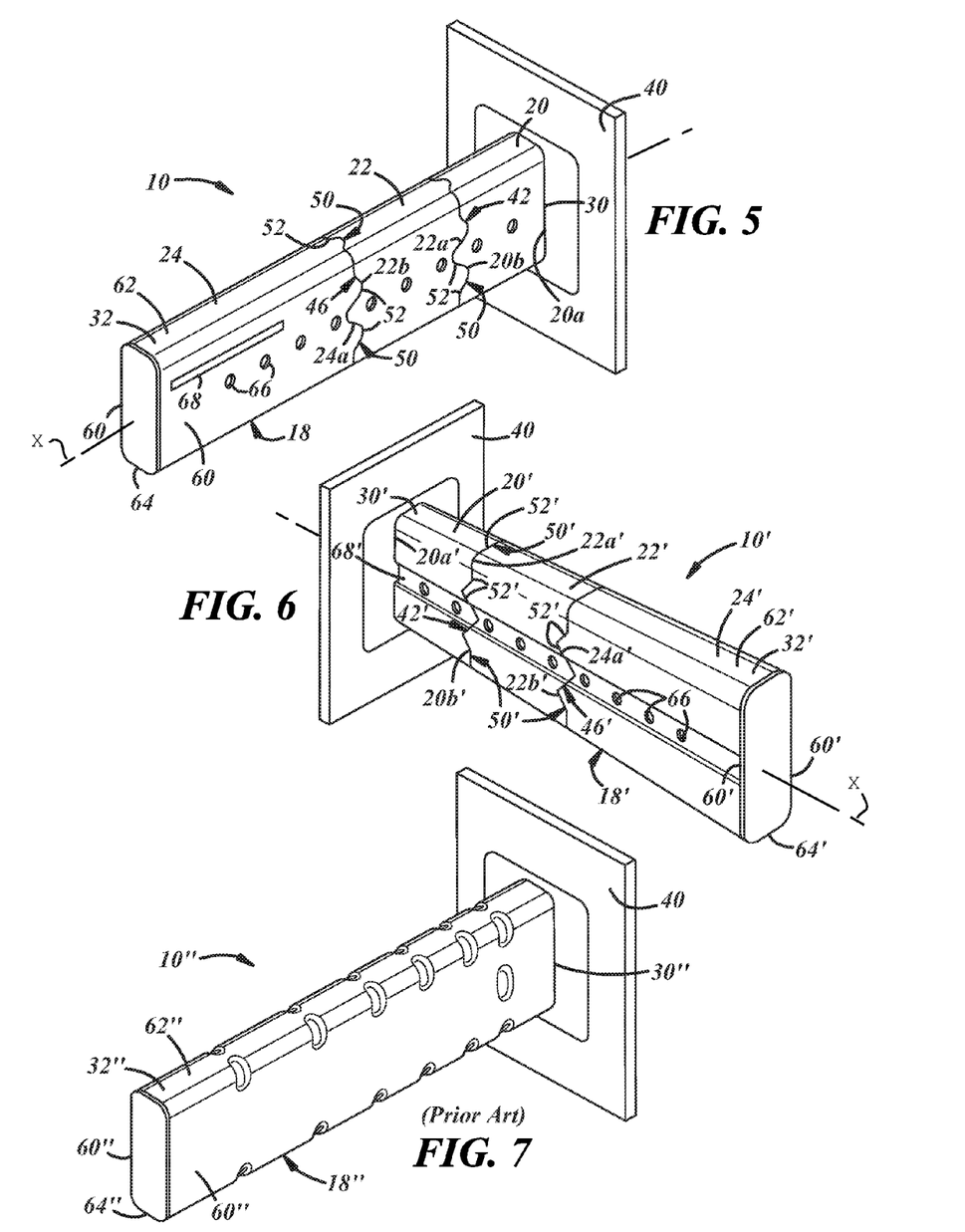
FIG. 7 is a perspective view of a conventional or baseline energy absorbing assembly.

Turning now to FIG. 6, there is shown another embodiment of an energy absorbing assembly 10' which is also a multi-piece assembly, however, this assembly is generally tapered from a first axial end 30' to a second axial end 32'. The illustrated embodiment includes first, second and third segments 20', 22', 24' separated by welded junctions 42', 46' with at least one non-linear portion 50' or junction feature 52'. Here, each segment of the energy absorbing assembly 10' is varied by some combination of segment length, metal material thickness, material grade or type and/or cross-sectional size in an effort to obtain a collision energy profile that is most desirable.

The illustrated embodiments of FIGS. 2-6 have secondary features that comprise strategically located holes or openings 66 and/or strengthening ribs or features 68; these features are collectively referred to as "secondary features." For example, a series of openings 66 are located along the longitudinal length of the energy absorbing assembly 10, 10', and these openings 66 can be sized, shaped and/or located in a certain manner that interacts or cooperates with the various junction features 52, 52', etc., if such features are included, to further control the collision energy profile. For instance, the openings can be axially aligned with a peak or valley or other junction feature 52, 52' (e.g., a straight section) on at least one of the top, bottom, or wider sides 62, 64, 60 in order to manipulate the energy absorption and/or transmission in that area. Other embodiments and arrangements, such as those including combinations of holes and slots, are certainly possible.

The ribs 68 may be provided to strengthen or otherwise influence the structural integrity of the assembly 10, 10' (e.g., see FIG. 5). The rib(s) 68 may include any longitudinally extending feature that protrudes or extends radially inwardly or radially outwardly (e.g., a ridge feature 68 or channel feature 68'). Possible arrangements include: a single rib, multiple ribs, sequentially aligned ribs, parallel aligned ribs, short or long ribs, ribs of different lengths, widths or thicknesses, radial depths or heights, as well as others. In some embodiments, the rib extends across one or more of the welded junctions; and in other embodiments they do not. Like the holes above, the ribs may be axially aligned or misaligned with (or offset from) one or more of the non-linear portions 50 or junction features 52 discussed above (e.g., a peak or valley). In addition, some of the secondary features may be aligned or purposefully misaligned with one another. For example, holes may be aligned (or misaligned) with other holes and/or ribs.

Figure 8:
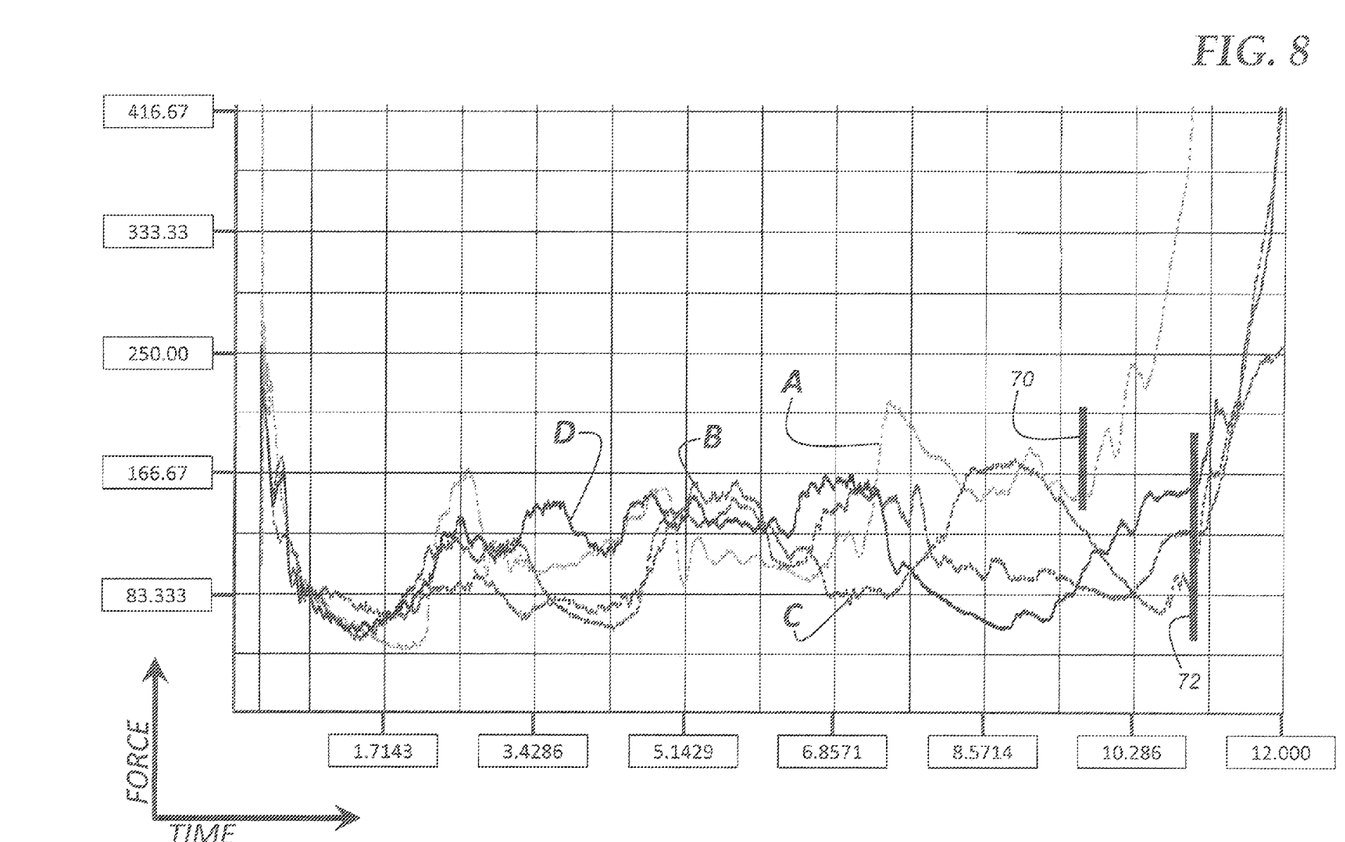
FIGS. 8 and 9 are graphs that illustrate test data for collision-related performance profiles of several different energy absorbing assemblies, including ones from FIGS. 2-6.

Impact or collision performance data for some of the energy absorbing assemblies described above is shown in the graphs of FIGS. 8 and 9. The graph in FIG. 8 compares four different energy absorbing assemblies: energy profile A is for a baseline or conventional assembly (e.g., assembly 10" in FIG. 7 which has no junctions); energy profile B is for an assembly that has a solitary flat or straight circumferential junction (not shown); energy profile C is for an assembly with a single peak, such as that shown in FIG. 2; and energy profile D is for an assembly with a double peak like that shown in FIG. 4. The graph plots instantaneous force (kN) on the y-axis and time (mS) on the x-axis, and extends from the beginning of impact to the moment when the respective assembly is fully crushed or compressed.

The energy profiles of FIG. 8 may be used to evaluate the smoothing or segment-to-segment energy transfer characteristics of the different assemblies; e.g., skilled artisans may compare or contrast the energy profiles having junctions (B, C, and D) with the baseline profile A to determine whether the addition of junctions minimizes spikes and transients during a collision event. Or the energy profiles C or D having non-linear portions 50 may be compared or contrasted with profile B that has a flat junction; e.g., to determine which arrangement better minimize spikes and transients.

Figure 9:
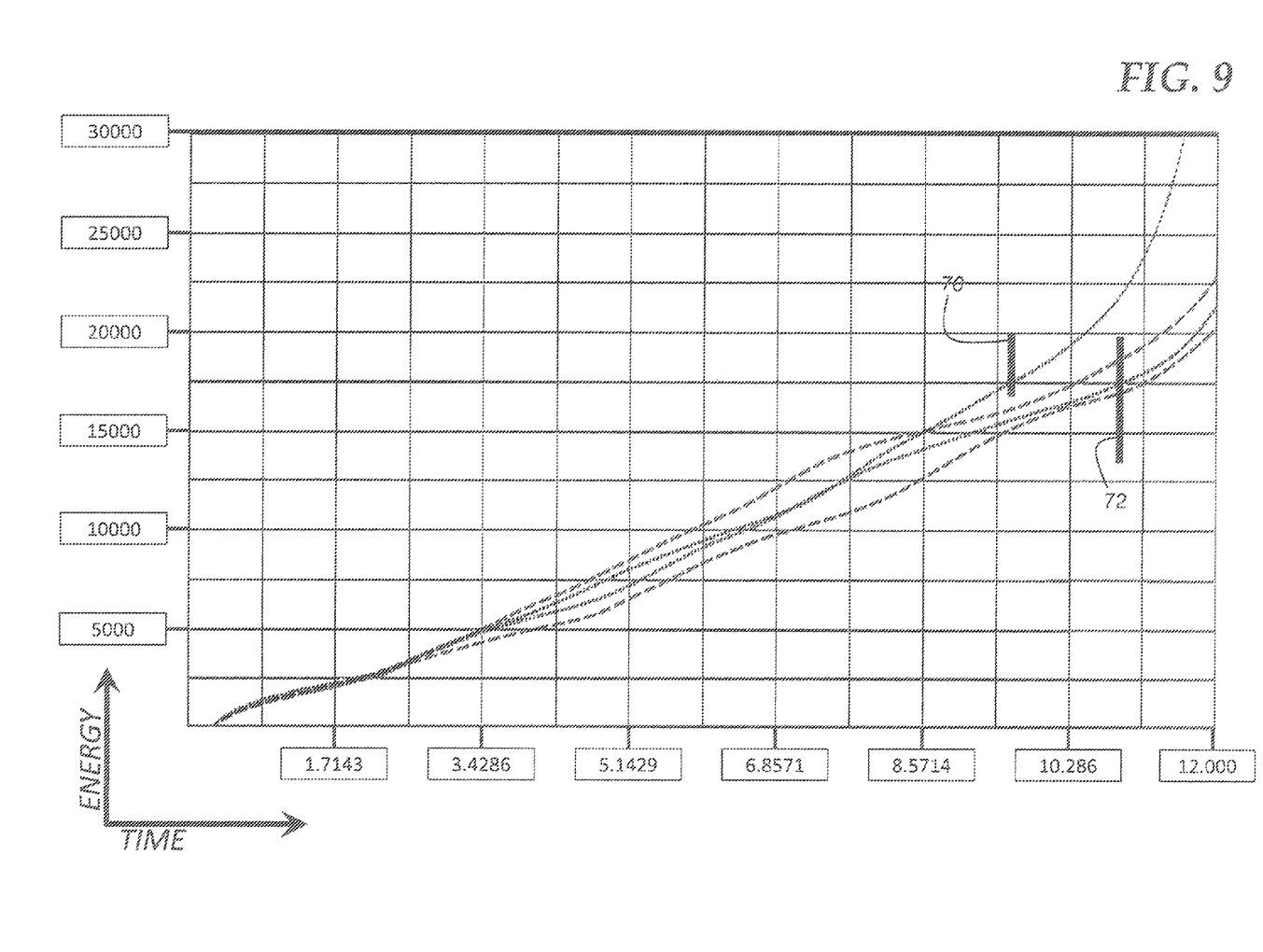

FIG. 9 illustrates an integration of each of the forces plotted in FIG. 8—thus, profiles for the same assemblies A, B, C, and D are shown. More specifically, FIG. 9 shows the cumulative or total absorbed energy (kJ) as a function of time (ms). FIG. 9 shows that the baseline assembly (A) is fully crushed or compressed at the point 70, which results in a shorter amount of energy absorbing duration than the other assemblies (B, C, D) which continue to crush and absorb energy until point 72. This affects the total amount of energy absorbed. In this particular testing sample, it was determined that assembly associated with profile D (having the double-peak junction) experienced roughly a 7% energy absorption improvement compared with the baseline profile A. This performance should be considered in light of the fact that assemblies C and D exhibited smaller spikes at some of the inter-segment junctions and weighed as much as 38% less than the assembly of baseline profile A.

In summary, skilled artisans will appreciate that a number of factors may be considered when determining the better profile—e.g., including the total energy absorbed by the assembly, the smoothing characteristics associated with the junctions 42, 46 in the assembly 10, the weight of the assembly 10, etc., just to name a few examples.

According to an exemplary process, any of the energy absorbing assemblies described above can be manufactured by the following sequence of steps: creating a flat, laser-welded blank that includes the first, second, and third segments 20, 22, 24 all laser welded together (e.g., a tailor-welded blank); next, press-break forming, U-forming, U-O-forming and/or otherwise forming the laser welded blank from the preceding step into the desired cross-section (which could be octagonal, hexagonal, pentagonal, rectangular, square, circular, oval, etc.); next, a longitudinal laser or other weld could be used to close the profile of the assembly 10 and could be provided with or without additional material, like filler material. The resulting energy absorbing assembly 10 can be lighter in weight, less expensive to build, have improved performance, and may be shorter in length, to cite several possibilities.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An energy absorbing assembly for use with a vehicle, comprising:
   a first axial end for coupling to a vehicle bumper;
   a second axial end for coupling to a vehicle frame; and
   a plurality of segments extending between the first and second axial ends along a longitudinal axis of the assembly and being welded together, the plurality of segments includes a first segment that extends from the first axial end, a second segment that extends from the first segment, and a welded junction that is located at the interface of the first and second segments and includes a non-linear portion having at least one junction feature that extends into either the first segment or the second segment in the direction of the longitudinal axis;
   wherein the non-linear portion is configured to influence the transmission of energy from the first segment to the second segment across the welded junction during a collision event by lessening energy profile peaks and energy profile valleys and thereby smoothing the transmission of energy from the first segment to the second segment across the welded junction.

2. The energy absorbing assembly of claim 1, wherein the first segment is shorter in axial length than the second segment.

3. The energy absorbing assembly of claim 1, wherein the first segment is made of a thinner gauge metal or different type of metal than the second segment so that the assembly includes a tailor welded blank.

4. The energy absorbing assembly of claim 1, wherein the first and second segments have the same cross-sectional shape and size at the interface of the first and second segments so that the welded junction includes a nonoverlapping laser welded butt joint.

5. The energy absorbing assembly of claim 1, wherein the at least one junction feature includes a single peak or a single valley located along the non-linear portion.

6. The energy absorbing assembly of claim 1, wherein the at least one junction feature includes a double peak or a double valley located along the non-linear portion.

7. The energy absorbing assembly of claim 1, wherein the at least one junction feature includes a plurality of peaks and valleys that are located along the nonlinear portion and together form a generally sinusoidal waveform that extends along an entire side of the assembly.

8. The energy absorbing assembly of claim 1, wherein the assembly further comprises at least one secondary feature located on either the first segment or the second segment, the at least one secondary feature is aligned with the at least one junction feature along the assembly in order to cooperate with one another and influence the transmission of energy during a collision event.

9. The energy absorbing assembly of claim 8, wherein the at least one secondary feature is axially aligned with the at least one junction feature along the assembly.

10. The energy absorbing assembly of claim 8, wherein the at least one secondary feature includes an opening that is formed in either the first segment or the second segment.

11. The energy absorbing assembly of claim 8, wherein the at least one secondary feature includes an axially extending rib that is formed in either the first segment, the second segment, or both the first and second segments, the rib extending radially inwardly or radially outwardly along a first side of the assembly.

12. The energy absorbing assembly of claim 1, wherein the assembly further comprises at least one secondary feature that extends from the first segment to the second segment across the weld junction.

13. The energy absorbing assembly of claim 1, wherein the welded junction extends around the interface of the first and second segments so that it is formed on a plurality of sides of the assembly, the welded junction includes the non-linear portion on a first side of the assembly and a second non-linear portion on a second side of the assembly.

14. The energy absorbing assembly of claim 13, further comprising a plurality of junction features, wherein the first side is wider than the second side and the first side includes more junction features than the second side.

15. The energy absorbing assembly of claim 1, wherein the plurality of segments includes the first segment that extends from the first axial end, the second segment that extends from the first segment, a third segment that extends from the second segment, the welded junction that is located at the interface of the first and second segments and includes the non-linear portion, and a second welded junction that is located at an interface of the second and third segments and includes a second non-linear portion, wherein the non-linear portion and the second non-linear portion include junction features that are aligned along the assembly in order to cooperate with one another during a collision event.

16. The energy absorbing assembly of claim 1, wherein the assembly is tapered along its axial length from a smaller first axial end to a larger second axial end.

17. An energy absorbing assembly for use with a vehicle, comprising:
   a first axial end for coupling to a vehicle bumper;
   a second axial end for coupling to a vehicle frame;
   a plurality of segments extending between the first and second axial ends along a longitudinal axis of the assembly and being welded together, the plurality of segments includes a first segment, a second segment, and a welded junction that is located at the interface of the first and second segments and includes at least one junction feature, the at least one junction feature includes one or more peaks, one or more valleys, one or more angled straight sections, one or more curved sections, or a combination thereof; and
   at least one secondary feature being formed in one of the first or second segments and being spaced from the at least one junction feature in the direction of the longitudinal axis, the at least one secondary feature includes one or more openings, one or more ribs, or a combination thereof;
   wherein the at least one junction feature and the at least one secondary feature are aligned along the assembly in order to cooperate with one another and influence the transmission of energy through the assembly during a collision event.

18. A method of absorbing energy at a front or rear bumper of a vehicle, comprising the steps of:
   receiving an external collision force at a first axial end of an energy absorbing assembly via the front or rear bumper, the energy absorbing assembly having a longitudinal axis and first and second segments joined to one another by a welded junction, the welded junction includes a non-linear portion with at least one junction feature that extends into either the first segment or the second segment in the direction of the longitudinal axis;

absorbing a portion of the energy of the external collision force in the first segment nearest the bumper;

lessening energy profile peaks and energy profile valleys as the energy of the external collision propagates across the weld joint from the first segment to the second segment, wherein the lessening of the energy profile peaks and valleys is at least partially caused by the non-linear portion; and absorbing a portion of the energy of the external collision force in the second segment.

* * * * *